United States Patent
Pettit et al.

(10) Patent No.: US 12,375,298 B2
(45) Date of Patent: Jul. 29, 2025

(54) METHODS AND DEVICES FOR AUTOMATED DIGITAL CERTIFICATE VERIFICATION

(71) Applicant: nChain Licensing AG, Zug (CH)

(72) Inventors: Michaella Pettit, London (GB); Wei Zhang, London (GB); Owen Vaughan, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 286 days.

(21) Appl. No.: 17/779,108

(22) PCT Filed: Nov. 16, 2020

(86) PCT No.: PCT/IB2020/060767
§ 371 (c)(1),
(2) Date: May 23, 2022

(87) PCT Pub. No.: WO2021/105816
PCT Pub. Date: Jun. 3, 2021

(65) Prior Publication Data
US 2023/0006840 A1 Jan. 5, 2023

(30) Foreign Application Priority Data
Nov. 25, 2019 (GB) .................................. 1917131

(51) Int. Cl.
*H04L 9/32* (2006.01)
*H04L 9/00* (2022.01)

(52) U.S. Cl.
CPC .............. *H04L 9/3268* (2013.01); *H04L 9/50* (2022.05)

(58) Field of Classification Search
CPC ................................ H04L 9/50; H04L 9/3268
See application file for complete search history.

(56) References Cited

U.S. PATENT DOCUMENTS 9,569,771 B2 * 2/2017 Lesavich ............... H04L 63/102
2017/0316390 A1 * 11/2017 Smith ................... H04L 9/0891
(Continued)

FOREIGN PATENT DOCUMENTS

| CN | 106372941 | 2/2017 |
|---|---|---|
| CN | 110086624 A | 8/2019 |

(Continued)

OTHER PUBLICATIONS

NPL Search Terms (Year: 2024).*
(Continued)

*Primary Examiner* — Syed A Zaidi
(74) *Attorney, Agent, or Firm* — Messner Reeves LLP

(57) ABSTRACT

A public key may be recorded on the blockchain by a certificate authority in such a manner that any third party may quickly and easily verify that the public key is certified by the certificate authority and that the certification has not been revoked. The certificate authority may be able to revoke the certification nearly instantaneously, and/or may be able to simultaneously certify a new key for the same entity while revoking the old key. The verification may be incorporated into a new transaction so that there is no gap between reliance on the certificate and the verification of its validity. In some cases, each transaction in which the certificate is used may also serve as linked certificate transaction that renews the certificate to enable a subsequent use.

33 Claims, 7 Drawing Sheets

(56) References Cited

U.S. PATENT DOCUMENTS

| | | | |
|---|---|---|---|
| 2017/0330180 A1 | 11/2017 | Song et al. | |
| 2018/0278427 A1 | 9/2018 | Thakore | |
| 2018/0285866 A1* | 10/2018 | Bederov | G06Q 20/10 |
| 2019/0005470 A1* | 1/2019 | Uhr | H04L 9/3239 |
| 2019/0188711 A1* | 6/2019 | Wu | G06Q 20/227 |
| 2020/0366480 A1* | 11/2020 | Noonan | H04L 9/3263 |
| 2023/0394468 A1* | 12/2023 | Garg | G06Q 20/3672 |

FOREIGN PATENT DOCUMENTS

| | | | | |
|---|---|---|---|---|
| CN | 110298152 | | 10/2019 | |
| CN | 110298180 B | * | 3/2021 | G06F 21/602 |
| WO | 2018234922 A1 | | 12/2018 | |
| WO | 2019023470 A1 | | 1/2019 | |

OTHER PUBLICATIONS

PCT/IB2020/060767 International Search Report and Written Opinion dated Feb. 9, 2021.

GB1917131.3 Combined Search and Examination Report dated Aug. 18, 2020.

Fuchita Y., "Special Feature: Innovation and Finance—Blockchain and Financial Transaction innovation," Nomura Capital Markets Quarterly, Japan, Nomura Institute of Capital Markets Research, Nov. 1, 2015, vol. 19, No. 2, 30 Pages.

\* cited by examiner

METHODS AND DEVICES FOR AUTOMATED DIGITAL CERTIFICATE VERIFICATION

CROSS REFERENCE TO RELATED APPLICATIONS

This application is the U.S. National Stage of International Application No. PCT/IB2020/060767 filed on Nov. 16, 2020, which claims the benefit of United Kingdom Patent Application No. 1917131.3, filed on Nov. 25, 2019, the contents of which are incorporated herein by reference in their entireties.

TECHNICAL FIELD

The present disclosure relates to blockchain networks and, in particular, to the use of a blockchain to facilitate digital certificate verification.

BACKGROUND

In a public key infrastructure, a computing device may have a public-private key pair to facilitate secure communications, digital signatures, non-repudiation, and other functions. As a part of the public key infrastructure, the computing device may have its public key registered with a certification authority, which provides the computing device with a digital certificate confirming ownership and authorization of the public key.

A problem with the use of certification authorities is that once they have issued a digital certificate then it remains valid until its specified expiry date. However, the public key may become compromised, necessitating revocation of the certification. To address that issue, certification authorities maintain "revocation lists" detailing which digital certificates should be considered revoked, and they regularly update and publish these lists. An entity wishing to validate a public key may rely on the digital certificate, but must also then obtain and review a corresponding certificate revocation list to see if the digital certificate has been invalidated by the certification authority. This system and its inherent delays means that some digital certificates may be revoked and that revocation may not yet be published or available to an entity that intends to rely on that digital certificate.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLES

Figure 1:
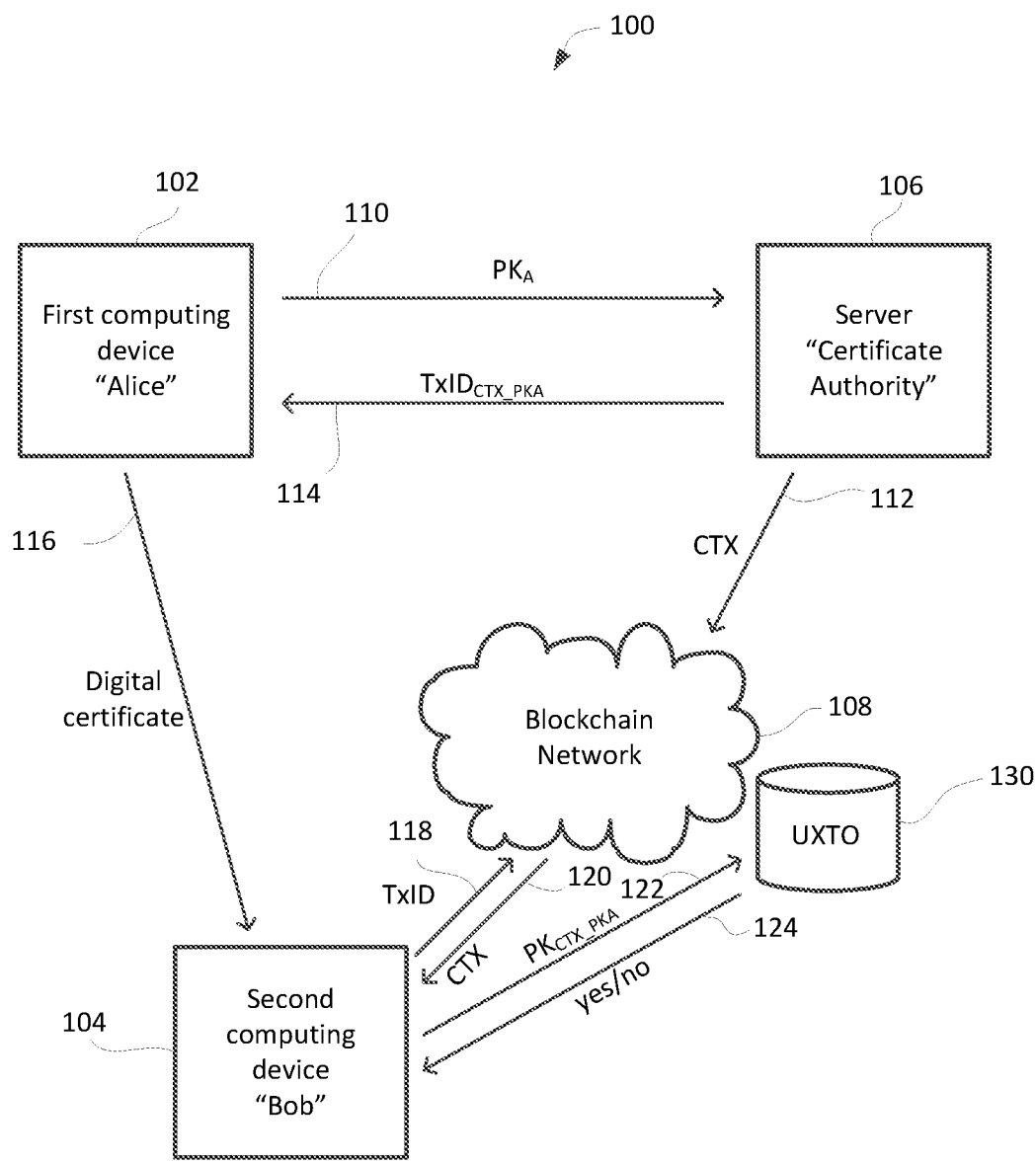
FIG. 1 diagrammatically illustrates an example system for managing a public key infrastructure.

In one aspect, there may be provided a computer-implemented method of managing public key infrastructure using a blockchain network. The method may include generating a digital certificate for a first entity, the first entity having a first public key, by creating a certification transaction, wherein the certification transaction includes a digital signature from a certificate authority, a first output to an address based on a second public key, and a second output having an information field that contains the first public key; determining a certification transaction identifier from a hash of the certification transaction; and propagating the certification transaction on the blockchain network. The digital certificate includes the first public key and the certification transaction identifier.

In some implementations, the second output includes an OP_RETURN field that contains at least the first public key. In some implementations, the first output includes a pay-to-public-key-hash (P2PKH) operation referencing an address obtained as a hash of the second public key. In some implementations, the certificate authority holds a second private key corresponding to the second public key.

In some implementations the method may further include verifying the digital certificate. Verifying the digital certificate may include obtaining a copy of the certification transaction from a blockchain based on the certification transaction identifier in the digital certificate; determining that the first output is an unspent transaction output; and determining that the first public key contained in the second output in the certification transaction matches a public key in the digital certificate. In some such implementations, determining that the first output is an unspent transaction output includes determining that the first output is present in an unspent transaction output pool of the blockchain network. In some such implementations, an input to the certification transaction may further include a certificate authority public key, and wherein verifying the digital certificate may further include determining that the certification transaction is signed by the certificate authority based on the certificate authority public key.

In some implementations, the method may further include revoking the digital certificate by generating a revocation transaction that includes, as an input, the first output of the certification transaction, and propagating the revocation transaction on the blockchain network.

In some implementations, the method may further include replacing the digital certificate with a new digital certificate for a new public key. Replacing may include creating a new certification transaction, wherein the new certification transaction includes as an input the first output of the certification transaction, a first new output to an new address based on a third public key, and a second new output having the information field, wherein the information field contains the new public key; determining a new certification transaction identifier from hashing the new certification transaction; and propagating the new certification transaction on the blockchain network. The new digital certificate may include the new public key and the new certification transaction identifier.

In some implementations, the information field is an OP_RETURN output.

In some implementations, the certification transaction includes an input referencing an unspent transaction outpoint address obtained from a hash of a certificate authority public key, and wherein the certification transaction includes an unlocking script for the unspent transaction outpoint address that includes the certificate authority public and the digital signature, and wherein the digital signature is generated based on a private key corresponding to the certificate authority public key.

In some implementations, the first output includes a multi-sig locking script enabling any one of two or more private keys to utilize the first output.

In a further aspect, the present application describes a computer-implemented method of verifying a digital certificate using a blockchain network. The digital certificate including a first public key and a certification transaction identifier. The method may include receiving the digital certificate from a first entity and obtaining a copy of the certification transaction from a blockchain based on the certification transaction identifier in the digital certificate, wherein the certification transaction includes a digital signature from a certificate authority, a first output to an address based on a second public key, and a second output having an information field. The method may further include determining that the information field contains a public key that matches the first public key in the digital certificate; querying an unspent transaction output pool to determine that the first output in the certification transaction has not been used in any subsequent transaction; and, based on those determinations, verifying that the first public key is certified valid.

In yet a further aspect, the present application describes a computer-implemented method of validating a certificate associated with a first node. The method may include receiving a transaction template from the first node, the transaction template containing a first input that references a certification transaction output and is signed by a certification transaction key; obtaining a copy of a certification transaction and determining that the certification transaction includes the certificate associated with the first node and that the certification transaction is signed by a certification authority key; and propagating the transaction template on a blockchain network, wherein the transaction template propagated includes a second input transferring resources to an output address. The transaction template is to be validated by nodes on the blockchain network if the certification transaction output is contained within an unspent transaction output set.

In some implementations, the transaction template includes an input from a first public key associated with the first node, and wherein the certificate includes the first public key. In some cases, propagating includes adding, to the transaction template prior to propagation, an output to a second public key associated with a second node.

In some implementations, the transaction template includes an output to a first public key associated with the first node, and wherein the certificate includes the first public key. In some cases, propagating includes adding, to the transaction template prior to propagation, an input from a second public key associated with a second node.

In some implementations, the certification transaction output includes a pay-to-public-key output in the certification transaction. In some cases, the certification transaction output is one of a plurality of pay-to-public-key outputs in the certification transaction, and wherein each of the pay-to-public-key outputs in the certification transaction involves a different respective public key.

In some implementations, obtaining includes identifying a last transaction in a series of linked transactions based on the last transaction containing the certification transaction output, and tracing through the series of linked transactions to identify the certification transaction. In some cases, obtaining further includes verifying that the certification transaction output is a multi-signature output for which a permitted signatory includes the certification authority key.

In some implementations, the unspent transaction output set includes all transaction outputs not yet utilized as an input to a further transaction, and wherein the unspent transaction output set is maintained by the blockchain network.

In some implementations, the certification transaction output is in a transaction having a transaction identifier, and wherein first input in the transaction template references the transaction identifier and wherein the certification transaction key is a private key associated with the transaction identifier and an index.

In some implementations, obtaining includes transmitting a request for the certification transaction to a node in the blockchain network and receiving a response containing the certification transaction.

In some implementations, obtaining includes receiving, from the first node, the copy of the certification transaction and a Merkle path associated with the certification transaction, and wherein the method further includes verifying that the certification transaction existing in a blockchain based on the copy of the certification transaction, the Merkle path, and a set of block headers for the blockchain.

In another aspect, there may be provided a computing device implementing a node in a network. The computing device may include memory, one or more processors, and computer-executable instructions that, when executed, cause the processors to carry out one or more of the methods described herein.

In yet another aspect, there may be provided a computer-readable medium storing processor-executable instructions for operating a node in a network, the processor-executable instructions including instructions that, when executed by one or more processors, cause the processors to carry out at least one of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application will refer to hashing or a hash function, which is intended to include any one of a number of cryptographic hash functions that, when applied to an arbitrary set of data or "message", deterministically produce a unique fixed-length alphanumeric string. The result of a hash function may be called a hash value, fingerprint, hash result, or equivalent. Examples include, but are not limited to, SHA-2, SHA-3, and BLAKE2.

In this document the term 'blockchain' is understood to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin, as exemplified by the Bitcoin SV protocol, may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented using a computer-based decentralised, distributed system. The blockchain is made up of blocks which in turn are made up of transactions. Each transaction is a data structure that encodes, among other possible information, the transfer of control of a digital asset between participants in the blockchain system and includes at least one input and at least one output. Each block header contains a summary of the block's contents, such as in the form of a Merkle root, and each block header contains a hash of the previous block header so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

The blockchain is implemented over a network of nodes. Each node is a computing device with network connectivity and executing software that carries out the applicable blockchain protocol. Nodes validate transactions and propagate them to other nodes in the network. Specialized network nodes, termed "mining nodes" or "miners", collect a set of unconfirmed transactions, i.e. pending transactions, into a block and attempt to "mine" the block. Mining, in these examples, refers to solving a proof-of-work (POW) before any other miner in the network succeeds in solving a proof-of-work for their respective block. In the Bitcoin example, a POW involves hashing a block header containing a nonce until the result is below a threshold value set by a difficultly parameter. The nonce is repeated incremented and the hashing repeated until the result is below the threshold value or until the miner receives notice that another miner has succeeded. Variations in mining process will be familiar to those ordinarily skilled in the art.

Among the various things that are checked when validating a transaction, a node determines whether the inputs to a transaction are valid. In particular, the node evaluates whether the unlocking script evaluates as true and determines whether the input references an "unspent transaction output" (UTXO) from an earlier transaction. Some nodes may maintain a running list or pool of UTXO to enable fast determination of whether a referenced transaction output is in the UTXO or not. The list or pool of UTXO may be referred to as an "unspent transaction output set". The blockchain network is configured to update and maintain the unspent transaction output set so as to prevent double-spending attacks. A transaction may be identified by its unique transaction identifier, TxID, which in some implementations is a hash of the transaction. Some transactions may have more than one output, so a unique transaction output (i.e. an outpoint) may be identified by the TxID and an index, where the index point to one of the outputs in the ordered set of outputs from the transaction. If the transaction output is present in the UTXO pool or set, then the output of that transaction is "unspent" and available to serve as an input.

The unlocking script for a transaction outpoint defines how "control" over that output is to be proven in order to be exercised. In many cases, the address associated with a transaction output is a hash of a public key. To prove control over that output, an unlocking script often requires the public key and a digital signature generated using the corresponding private key. In this manner, the node that controls the private key is able to control when and how the transaction output is used in any subsequent input. As will be discussed further below, this has the corollary that when a transaction input corresponding to a particular public key includes a digital signature generated using the corresponding private key, then the entity associated with that particular public key is effectively signing or certifying the transaction contents.

Public-key cryptography has become ubiquitous in online communications. In many instances, a process and policy is needed to provide certainty that a public key is owned by an associated with a particular entity. The most common approach to ensuring that a public key is authentic and has not been compromised is a public key infrastructure (PKI). PKI relies upon a trusted third party to "authenticate" public keys as valid. These entities are "certificate authorities" (CAs). The CAs provide for registration and issuance of digital certificates that confirm the binding between a public key and a particular owner. The holder of a public key provides another entity with its public key and its digital certificate. The other entity may then verify the authenticity of the public key by confirming that a trusted CA has digitally signed the public key as belonging to the holder.

One of the problems with existing PKI is that sometimes a public key becomes compromised, for example if the private key is lost or disclosed before a certificate's specified expiry date. For that reason, the CA may maintain a certificate revocation list. Any entity wishing to rely upon a certificate associated with a public key must then also seek out and review an associated certificate revocation list to confirm that the certificate has not been revoked by the CA. This compromises the ability to authenticate keys offline and creates risks due to the delay between revocation and publication of a new certificate revocation list, which is often 24 hours or more.

In accordance with one aspect of the present application, a blockchain network may be used to improve upon public-key infrastructure by providing for fast and secure validation, revocation and update of digital certificates. A public key may be recorded on the blockchain by a certificate authority in such a manner that any third party may quickly and easily verify that the public key is certified by the certificate authority and that the certification has not been revoked. By recording the public key in the manner described below, the certificate authority may be able to revoke the certification nearly instantaneously, or may be able to simultaneously certify a new key for the same entity while revoking the old key. In some cases, the ability to revoke a certification may be given to the owner of the public key or, in some cases, to one or even a group of other entities.

Reference will now be made to FIG. 1, which diagrammatically illustrates an example system 100 for managing a public key infrastructure. The system 100 in this example includes a first computing device 102, a second computing device 104, and a server 106. The first computing device 102 and the second computing device 104 may be implemented by way of any network-enabled computing device, including servers, personal computers, tablets, smartphones, connected cars, Internet-of-things devices, or any other such devices. The server 106 is operated by a certificate authority (CA) and is configured to receive and respond to requests for digital certificates. Although the CA is depicted as being implemented by the server 106, it will be understood that the CA functions may be implemented by one or more servers or other computing devices.

The system 100 further includes a blockchain network 108. The blockchain network 108 includes a network of nodes operating in accordance with an applicable blockchain protocol. In some implementations, one or more of the first computing device 100, the second computing device 104, and/or the server 106 may also be nodes in the blockchain network 108, although in the present example they are depicted as being nodes separate from the blockchain network 108 for ease of explanation.

In this example system 100, the first computing device 102, labelled "Alice", has a public-private key pair for using in asymmetric cryptographic communications. To use the public key in some cryptographic scenarios, Alice may need to have a corresponding digital certificate authenticating the public key and its association with Alice. Accordingly, in operation 110, Alice provides the public key $PK_A$ to the CA with a request for registration. The CA may engage in some level of authentication to ensure Alice's identity as owner of the public key. In some cases, this authentication may be automated online operations carried out by the server 106 based on the data provided in operation 110. In some cases, this authentication may also or alternatively include offline authentication operations. Two-factor authentication and other such techniques may be employed.

Once the CA determines that the public key $PK_A$ is to be certified, it generates a blockchain transaction, the "certification transaction" (CTX), that includes the public key $PK_A$ and that is signed by the CA. That certification transaction further includes an output controlled by the CA. The transaction is submitted to the blockchain network 108 as indicated by operation 112. The CA then provides Alice with the certification transaction identifier $TxID_{CRX\_PKA}$ in operation 114. In some implementations, Alice may obtain a copy of the certification transaction from the blockchain network 108 based on the transaction identifier to confirm that it conforms to expectations and contains the public key $PK_A$.

The transaction identifier $TxID_{CTX\_PKA}$, together with the public key $PK_A$, effectively form a digital certificate for Alice. In connection with some communication with the second communication device 104, which in this example is labelled "Bob", Alice may transmit its digital certificate to Bob in operation 116. Bob is then able to authenticate the public key $PK_A$ and verify that the certification has not been revoked based on the blockchain maintained by the blockchain network 108.

In particular, in operations 118 and 120, Bob may request and receive a copy of the certification transaction. From the certification transaction, Bob may verify that it contains Alice's purported public key $PK_A$, and that it has been signed by a trusted certification authority. Bob is further able to verify that the certification has not been revoked by querying whether the transaction output controlled by the CA remains "unspent", i.e. that the transaction output point is present in a UTXO pool 130 for the blockchain network 108, as indicated by operations 122 and 124. The UTXO pool 130 is a pool of "unspent" transaction output points maintained by any one of a number of nodes of the blockchain network 108.

Figure 2:
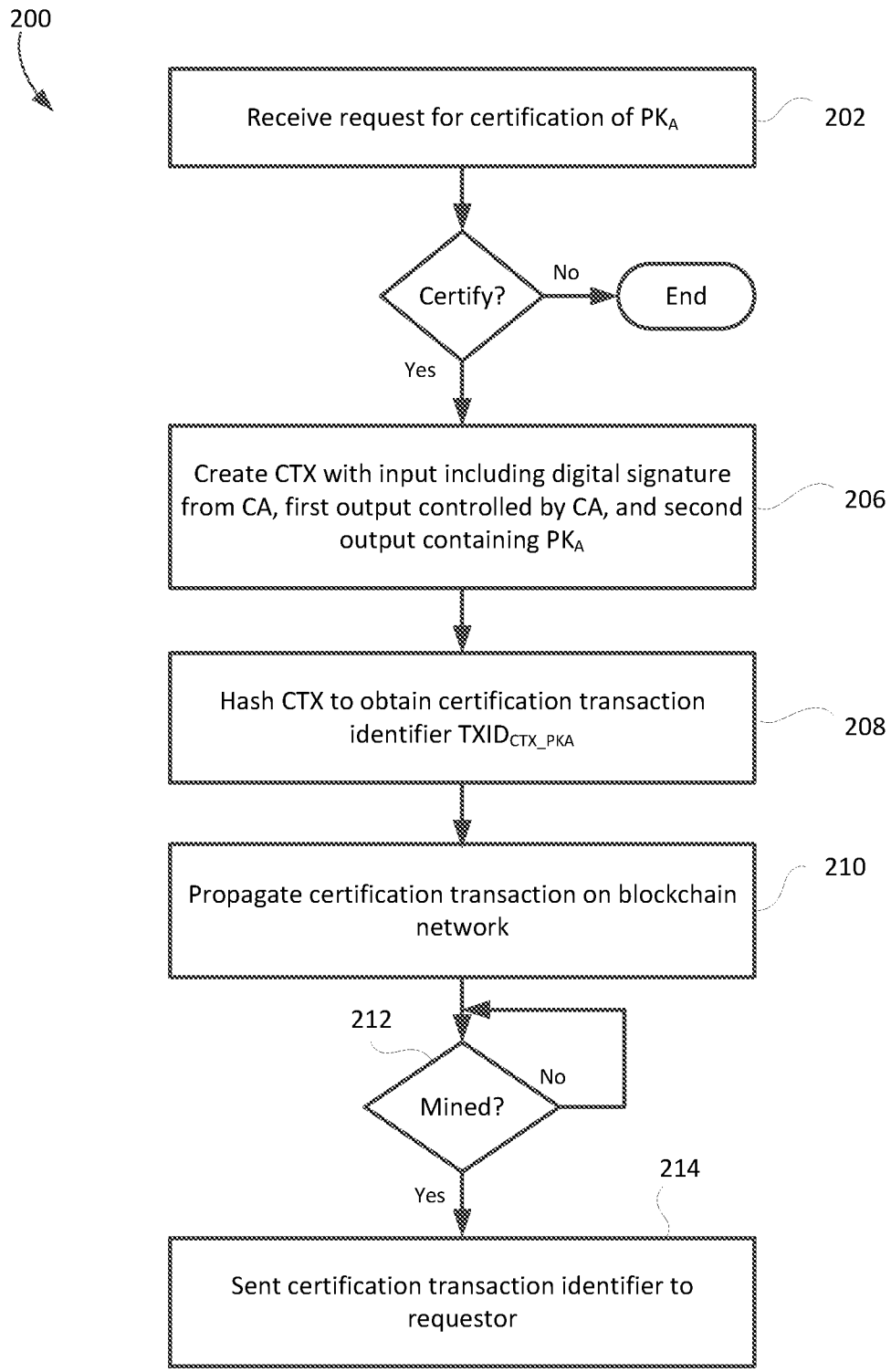
FIG. 2 shows, in flowchart form, one example method for registering a public key with a certification authority.

Reference will now be made to FIG. 2, which shows in flowchart form, one example method 200 for registering a public key with a certification authority. The example method 200 is implemented by an authorized certification authority, and may be implemented by one or more servers suitably programmed to carry out the functions described.

In operation 202, the certification authority receives a request from Alice for certification of a public key, $PK_A$. The certification authority may carry out authentication or authorization protocols in accordance with its applicable policies. Those protocols may include automated computer-implemented operations and/or administrator-facilitated operations. Regardless of the specific authentication operations, in operation 204 a determination is made as to whether to certify the public key for Alice. If not, then the method 200 ends. If certification will be granted, then in operation 206 the certification authority creates a certification transaction. As noted above, the certification transaction includes an input that includes the certification authority's public key and a digital signature from the certification authority, an output controlled by the certification authority, and the public key $PK_A$. To provide a specific example, the input may be a UTXO of some nominal or arbitrary value for which the certification authority has the private key to generate a signature in a valid unlocking script. The UTXO may be associated with sufficient digital value to offset any transaction fee due for mining the certification transaction.

The certification transaction may include two outputs: a first one based on a CA public key $PK_{CTX\_PKA}$ selected by and controlled by the certification authority, and second one that contains the public key $PK_A$ in, for example, a non-operational information field. An example of the latter is an OP_RETURN function in Bitcoin. OP_RETURN is effectively an output into which arbitrary data may be placed for recordal on the blockchain once the transaction is mined.

The first output may be, for example, a P2PKH (pay to public key hash) operation specifying transfer to a public key hash (e.g. a Bitcoin address) selected and controlled by the certification authority.

By way of its digital signature in the transaction, the certification authority both authorizes input of the UTXO to the transaction, thereby satisfying the unlocking script, and provides verifiable evidence that the certification authority has certified the public key $PK_A$ appearing in the OP_RETURN output. Note that in some implementations additional information may appear in the OP_RETURN output field, such as a digital signature from Alice, or other such data.

Once the certification transaction has been created, the certification authority hashes the transaction to find the transaction identifier $TxID_{CTX\_PKA}$ in operation 208 and it propagates the transaction on the blockchain network as indicated by operation 210. It will be appreciated that "propagating" the transaction includes submitting it to a node of the blockchain network, where it is verified and then transmitted to all other nodes, which in turn verify and re-transmit, until the transaction has reached substantially all nodes in the network. In some embodiments, the certification authority is, itself, one of the nodes in the blockchain network.

In operation 212, the certification authority awaits mining of a block containing the certification transaction, i.e. a "confirmation" of the transaction, and then transmits the transaction identifier $TxID_{CTX\_PKA}$ to Alice in operation 214. In some implementations, the certification authority may provide the transaction identifier to Alice prior to the transaction being mined.

Alice is then able to provide any third parties with a digital certificate that includes Alice's public key $PK_A$ and the certification transaction identifier $TxID_{CTX\_PKA}$. From this, the third party may verify that Alice's public key is certified by a CA.

A simplified example of a certification transaction is shown below:

The method 300 includes, in operation 302, receiving the digital certificate for another entity, such as the first computing device 102 (FIG. 1) labelled "Alice". The digital certificate includes at least the public key $PK_A$ and the certification transaction identifier $TxID_{CRX\_PKA}$. Using the certification transaction identifier, the certification transaction is obtained from the blockchain network in operation 304. It will be appreciated that the certification transaction may be obtained from a copy of the blockchain, whether that copy is local to the computing device or whether it is maintained by a node in the blockchain network. In the unlikely event that the transaction has not yet been confirmed, i.e. is not yet in a mined block, then the transaction may be present in the mempool of unconfirmed transactions; however, in many implementations the certification authority may only provide Alice with the certification transaction identifier after the certification transaction has been mined.

From the certification transaction, the computing device may verify certain things. In particular, in operation 306, the computing device may verify that the certification transaction is signed by a certification authority. The computing device may have, or have access to, a list of recognized or accredited certification authorities and their respective public keys, which may enable the computing device to validate a digital signature. The digital signature may form part of an input to the certification transaction, as described. By confirming that the certification transaction is signed by a trusted or recognized certification authority, the computing device is able to confirm that the certification is legitimate. Note that the computing device does not necessarily need to verify the digital signature in the input if the transaction is on the blockchain, because it will have been confirmed and verified by miners. Rather, the computing device may simply verify that the public key identified in the input is associated with the certification authority.

The computing device may further verify that one of the output points of the certification transaction remains "unspent", i.e. that output point is found in the UTXO pool, as indicated by operation 308. This verification operation confirms that the certification remains valid and unrevoked. As discussed above, this output point is controlled by the certification authority in most embodiments (alternatives are described below), which enables the certification authority

| Certificate Transaction - $TXID_{CTX-PK_A}$ | |
|---|---|
| Input 1: | Output 1: |
| Outpoint (transaction id and output index): CA's unspent outpoint<br>Unlocking script: < CA's Sig > < CA's PK ><br>Sequence number: 0xFFFFFFFF | P2PKH (the hash of CA's public key, can be different from CA's PK in the input)<br>Output 2:<br>OP_RETURN $PK_A$ |

It will be noted that the unlocking script for the input includes the certification authority's public key and a signature generated by the certification authority. Alice's public key $PK_A$ appears in the OP_RETURN field as the second output. The first output is any public key hash controlled by the certification authority.

Figure 3:
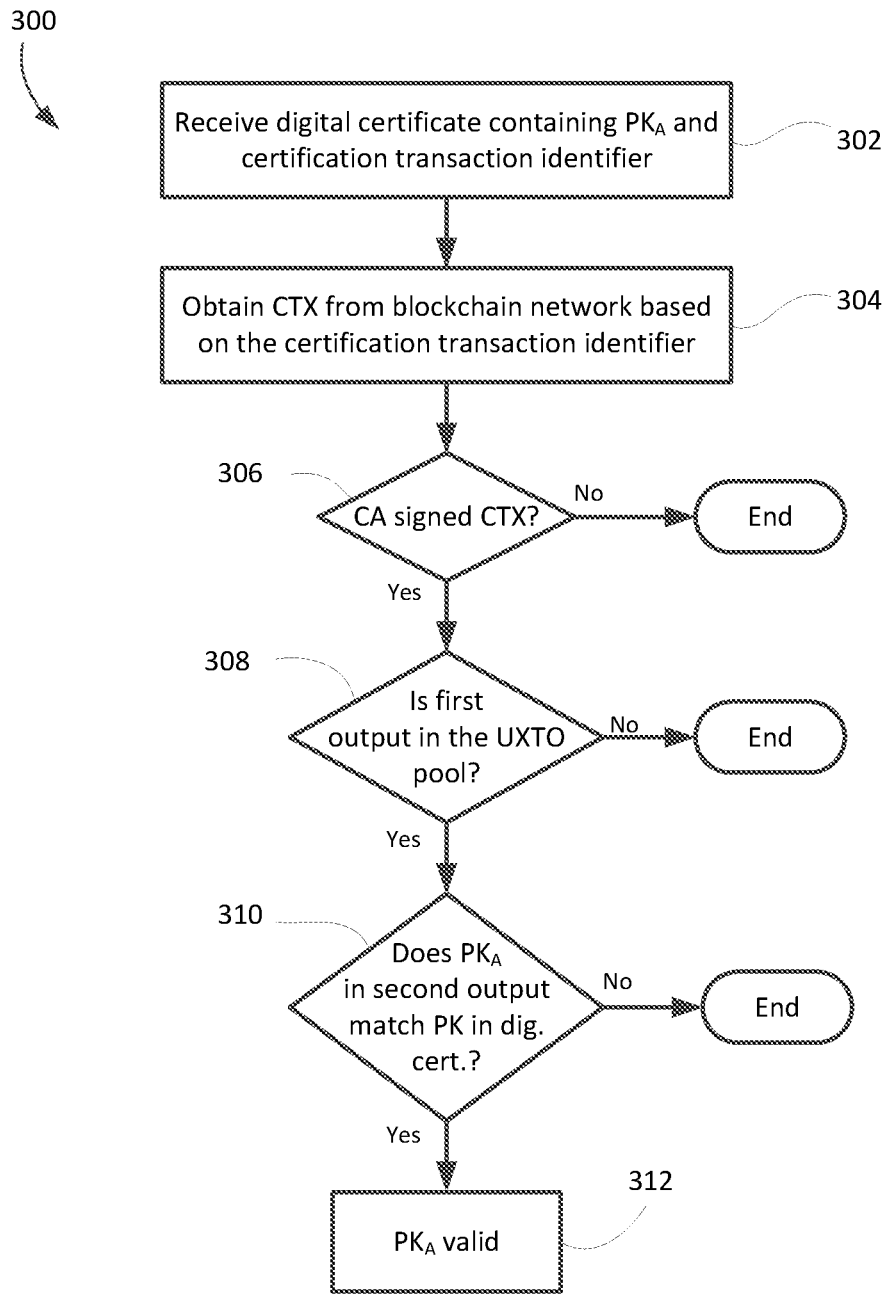
FIG. 3 shows, in flowchart form, one example method of verifying a public key.

Reference is now made to FIG. 3, which shows one example method 300 of verifying a public key. The operations described in the example method 300 may be carried out by a computing device attempting to verify a public key purporting to be certified using the process exemplified in FIG. 2. Example computing devices include any network-enabled computing device.

to cancel a certification if the key is compromised, expired, or otherwise no longer valid. Revocation or cancelation is easily facilitated by having the certification authority "spend" the output point, thereby removing it from the UTXO pool. Confirmation that the output point is present in the UTXO pool may be carried out by, for example, querying the UTXO pool based on the TxID number and an output index. In some examples, the computing device may query the UTXO pool through an intermediary, such as a node of the blockchain network.

In operation 310, the computing device confirms that the public key $PK_A$ in the second output of the certification transaction matches the public key $PK_A$ received as part of the digital certificate from Alice.

If operations 306, 308 and 310 are all confirmed, then the computing device determines that the public key $PK_A$ in the received digital certificate from Alice is valid in operation 312.

By using the blockchain network to record public key certification, certification authorities are able to quickly and easily revoke a certification by "spending" the output point, such that the verification at operation 308 fails. Accordingly, a certification authority may revoke certification of a public key by generating and propagating a transaction that uses the first output of the certification transactions. As discussed above, the first output may be a P2PKH operation that transfers a nominal digital asset to the public key hash address specified in the first output. The unlocking script for that first output may, in these examples, require a digital signature from the certification authority, which requires control over the private key corresponding to the CA public key $PK_{CTX\_PKA}$ used in the P2PKH operation.

In some cases, the certification authority may not simply revoke a certification, but may be asked to replace/update a certified public key. For example, if the private key is lost or compromised, then the owner (e.g. Alice) may request that the certification authority update or replace the previously-certified public key with a new public key $PK_{A\_new}$. The certification authority authenticates the request using whatever online or offline authentication mechanisms are in place and, if it determines that the update operation is to occur, then it creates a new certification transaction $CTX_{new}$ to both revoke the old certification and issue a new certification.

The new certification transaction features the same types of outputs, i.e. a P2PKH operation using a new public key selected by the CA, such as $PK_{CTX\_new}$, and an OP_RE-TURN field containing $PK_{A\_new}$. However, the input may include the CA-controlled output point from the original certification transaction $TxID_{CTX\_PKA}$. By "spending" that output as the input to the new certification transaction, the revocation is effected by removing that output point from the UXTO pool. Advantageously, the revocation of the old public key certification and the registration of the new public key certification occur in a single transaction. Moreover, no separate periodically published list of certificate revocations needs to be maintained and made available by the certification authority.

As mentioned above, in many cases the first output point of a certification transaction may be controlled by a certification authority, such that only the certification authority is able to revoke the certification of the public key. Revocation is based on "spending" the first output point using the private key corresponding to that output point. In some cases, however, it may be advantageous to structure the certification transaction to permit other entities to revoke the certification.

For example, in some situations the owner of the public key, e.g. Alice, may have the authority to revoke its own public key. In this arrangement, the first output point in the certificate transaction is controlled by Alice, i.e. references a public key (public key hash) for which Alice has the corresponding private key. That is, the unlocking script for the first output point requires a digital signature from Alice. This arrangement may be advantageous for some public key certification scenarios, such as registration with an online service. One example of an online service is a social media account on a social media platform. The platform may use the above-described mechanism to register a user's public key for use with the platform, enabling the user to interact with the platform and/or other users of the platform on a trusted basis due to their digital certificate backed up via the certification transaction. The user is then able to revoke the certification so as to terminate their account without cooperation of the platform.

In another scenario, more than one output point may be provided either one of which may be "spent" so as to terminate the certification. In such a scenario, third parties are configured to test both (or all) such output points of a certification transaction for their presence as unspent transaction outputs in the UTXO pool.

Alternatively, if revocation from any one of multiple parties is to be facilitated, then the first output may be configured to use multiple signatures, i.e. where any one of a number of signatures may be used to "spend" the output. For this purpose, Multi-sig may be used in the output.

In yet another scenario, multi-sig may be configured to ensure that at least a threshold number of entities agree to revoke the certification. Multi-sig may be configured to require n out of m signatures to unlock an output, wherein n≤m. As an example, in the case of an organization, such as a business, partnership or other such collection of individuals, a certified public key associated with the organization may be revocable only if all or at least a threshold number of certain entities sign off on the revocation, such as the CEO, COO, CTO, or other executives or individuals involved in the business.

It will be appreciated that it may be that some or all of the above-described operations of the various above-described example methods may be performed in orders other than those illustrated and/or may be performed concurrently without varying the overall operation of those methods.

Automated Certification Verification

The above-described methods provide mechanisms for issuing digital certificates secured by a blockchain network. The mechanisms enable fast verification of validity of a digital certificate and the ability for near instantaneous revocation of a digital certificate. As noted above, to verify the validity of a digital certificate, the node seeking validation of the certificate checks to see whether an outpoint of the certificate transaction is in the UTXO set, and that the public key in the digital certificate being validated matches the public key in the OP_RETURN field of the certificate transaction.

One potential drawback of the described method is that there may be a time delay between verification of the digital certificate and any subsequent transaction that relies upon that verification. During that interval, it is possible that the digital certificate is revoked for some reason. Moreover, verification of the digital certificate relies on accessing and checking the UXTO set, which may be difficult or impossible for some nodes, like lightweight simplified payment verification (SPV) nodes (e.g. digital wallets). This may require those nodes to rely on a third-party node to do the verification for them, which creates security and reliability concerns. Moreover, the node verifying that the outpoint is in the UXTO set must be online with active access to the blockchain network, which many nodes, like lightweight SPVs may not have at certain times.

In accordance with another aspect of the present application, validation of the digital certificate may be incorporated into a transaction such that the transaction only goes forward if the digital certificate is valid. This enables lightweight SPVs and similar nodes to collaborate with other nodes in generating transactions that incorporate automatic digital certificate validation. Advantageously, this may eliminate the gap in time between digital certificate validation and reliance on that validation in committing to a transaction.

In some of the examples below, a node may have its public key certified by a certification authority node in the form of a certification transaction, which may take the form of this example:

| Certification Transaction - $\text{TXID}_{CTX\text{-}PK_A}$ | | | |
|---|---|---|---|
| Inputs: | | Outputs: | |
| Outpoint | Unlocking Script | Value | Locking Script |
| $\text{TXID}_{CA}$ | $<\text{SIG}_{CA}><\text{PK}_{CA}>$ | x BSV | OP_DUP OP_HASH160 $<\text{PK}_{CTX_A}>$ OP_EQUALVERIFY OP_CHECKSIG |
| | | 0 BSV | OP_RETURN $<\text{Cert}<<\text{PK}_A>>>$ |

The above example is a certification transaction certifying node A's public key $PK_A$. It will be noted that the OP_RETURN output contains the certificate for public key $PK_A$. In some examples, this may simply be the public key itself. In some cases, it may be a hash of the public key. In some cases additional data may be included with the public key in the certificate contained in the OP_RETURN output.

It will also be noted that the input is a transaction outpoint controlled by the certification authority and that its unlocking script is signed by the certification authority. The output is a pay-to-public-key-hash (P2PKH) to a certification transaction public key, The $PK_{CTX_A}$. The public key $PK_{CTX_A}$ has a corresponding private key. The private key may be generated by the certification authority at the time of creation of the certification transaction in some cases. The certification authority may share the private key with node A. That is, when node A requests certification of its public key $PK_A$, the certification authority may return the transaction identifier $\text{TXID}_{CTX\text{-}PK_A}$ for the certification transaction and the private key enabling use of the certification transaction.

Such a certificate may be invalidated or revoked by use of the outpoint in a subsequent transaction, which involves a signature using the private key corresponding to certification transaction public key $PK_{CTX_A}$. The certification authority node and node A are both in possession of this key in this example.

As noted above, the certification transaction may be used to automate verification of a digital certificate. In particular, the automation is in the checking of the UXTO set. A new transaction, such as a payment transaction for example, includes as a pre-condition that the outpoint of the certification transaction be present in the UXTO set. This ensures that the new transaction is only valid if the certificate is still valid and has not been revoked.

In general, a node (e.g. Alice) that has a digital certificate certifying its public key generates a transaction template that includes, as an input, the outpoint of the certificate. The input is signed with a certification transaction key, e.g. using the private key corresponding to the P2PKH output of the certification transaction. This transaction template is provided to another node (e.g. Bob) participating in the transaction. The other node, Bob, obtains the certification transaction based on the reference to the TXID for the certification transaction in an input to the transaction template, verifies that the purported public key, $PK_A$, is in fact certified by the certification transaction, and adds whatever inputs/outputs complete the transaction template. The transaction template may then be propagated on the blockchain network. If the input signed by the certification transaction key fails because the output has already been used in another transaction, i.e. it is not in the UTXO set, then the whole transaction fails and will not be propagated or mined. If the input signed by the certification transaction key is valid because it is in the UTXO set, then the transaction will be validated, propagated, and will go into the mempool and, eventually, into a mined block.

In one example, this mechanism may be used to verify a receiver's address. For example, in a situation in which Alice requests a digital asset or some other transfer from Bob, Bob may wish to validate Alice's identity, e.g. that her purported public key is certified, prior to committing to such a transaction. In such a situation, Alice may prepare a transaction template that includes payment to her public key with an input referencing a certification transaction for that public key. On receiving the transaction template, Bob may retrieve the certification transaction from the blockchain, verify that it certifies Alice's public key, and confirm that it is digitally signed by a certification authority. Bob may then add an input to the transaction template transferring the digital asset, and the transaction template may then be propagated on the blockchain. Provided that Alice's digital certificate is still valid, i.e. it has not been revoked, then the transaction will proceed. An example of such a transaction is below:

| $\text{TXID}_{verify/receiver}$ | | | |
|---|---|---|---|
| Inputs: | | Outputs: | |
| Outpoint | Unlocking Script | Value | Locking Script |
| $\text{TXID}_{CTX\text{-}PK_A}$ | $<\text{SIG}_{CTX_A}><\text{PK}_{CTX_A}>$ | y BSV | OP_DUP OP_HASH160 $<\text{PK}_A>$ OP_EQUALVERIFY OP_CHECKSIG |
| $\text{TXID}_{Bob}$ | $<\text{SIG}_B><\text{PK}_B>$ | | |

In the above example transaction, Bob may rely on the fact that the transaction will be rejected as invalid if the referenced outpoint from $\text{TXID}_{CTX\text{-}PK_A}$ is not in the UXTO set as an unspent transaction output.

In another example, this mechanism may be used to verify a sender's address, such as to comply with Know Your Customer (KYC) conditions. For example, Alice may be transferring an asset to Bob and Bob wishes to verify Alice's identity before accepting the transfer. In this case, Alice prepares a transaction template that includes an input transferring the digital asset and signed in association with her public key $PK_A$. It also includes the certification transaction certifying that public key as an input. On receiving the transaction template, Bob may obtain the certification transaction, verify it is signed by a certification authority, and verify that it certifies Alice's public key. If so, then Bob completes the transaction template by adding an output to transfer the digital asset to a public key address controlled by Bob. Such an example transaction may take the following form:

| $TXID_{verifysender}$ | | | |
|---|---|---|---|
| Inputs: | | Outputs: | |
| Outpoint | Unlocking Script | Value | Locking Script |
| $TXID_{CTX-PK_A}$ | $<SIG_{CTX_A}><PK_{CTX_A}>$ | y BSV | OP_DUP OP_HASH160 $<PK_B>$ OP_EQUALVERIFY OP_CHECKSIG |
| $TXID_{Alice}$ | $<SIG_A><PK_A>$ | | |

It will be appreciated that in each of the two above-detailed examples, as soon as the digital certificate is used in a transaction to prove validity of a public key it is then invalid. That is, the certificate may only be used once and is automatically revoked once used. This may find application in some instances, such as for single-occasion large value transfers of assets to a verified address or from a verified address. Such a transaction may be used in the case of automobile transfers, real estate transactions, share sales, or other such high-value transfers. However, for smaller value everyday transactions, it may be cumbersome to return to the certification authority for a new certificate every time one is used. Accordingly, multiple use certificates may be constructed, as will be described later below.

Figure 4:
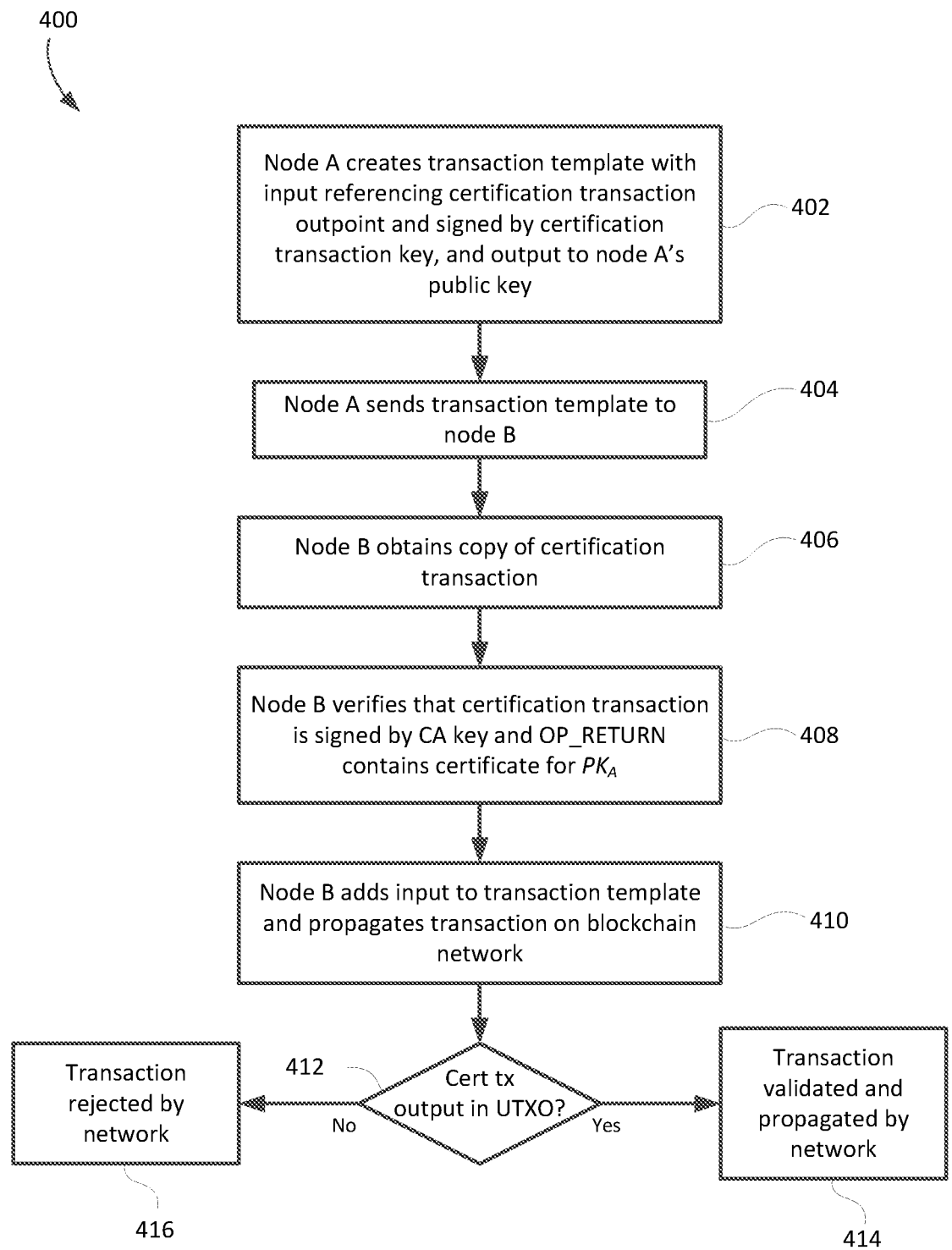
FIG. 4 shows, in flowchart form, an example method of validating a digital certificate.

Reference will first be made to FIG. 4, which shows, in flowchart form, one example method 400 of validating a certificate associated with a first node. The method may be implemented by computing devices, such as mobile phones, tablets, personal computers, or the like. The computing devices includes one or more processor units and associated memory storing computer executable instructions that, when executed by the processing units, cause the processing units to carry out the described operations. In some cases, the computer executable instructions may be stored in the form of an application, such as a wallet application for example.

The method 400 provides an example of automated certificate verification for verifying the identity of a recipient. In this example transaction, node A is a recipient and node B is a sender. The nodes may communicate over wired and/or wireless networks. In some cases, the nodes may communicate using near-field communications, for example via a point-of-sale terminal. The method 400 begins with node A creating a transaction template in operation 402. The transaction template includes an input that references a certification transaction output from a certification transaction certifying the identity of node A, e.g. certifying node A's public key $PK_A$. The output in the certification transaction is a pay-to-public-key operation referencing a certification transaction public key $PK_{CTX_A}$. The corresponding private key may be referred to as a certification transaction key. The input to the transaction template is signed by the certification transaction key generating a signature, $SIG_{CTX_A}$. The transaction template also includes an output transferring resources to node A's public key, $PK_A$.

As indicated by operation 404, node A sends this transaction template to node B. The transaction template does not yet contain an input from node B and/or if an input is included it is not signed by node B.

On receiving the transaction template, in operation 406 node B identifies the certification transaction based on the reference to it in the input to the transaction template. Because the reference includes the transaction identifier for the certification transaction, node B is able to retrieve a copy of the certification transaction. If node B stores a local copy of the blockchain, it may obtain the certification transaction by it looking up in the local copy. If not, then node B may sends a query or request to a blockchain node for a copy of the certification transaction based on the transaction identifier. In some instances, this verification may be done as a proof of existence of the certification transaction. That is, if node B is provided with a copy of the certification transaction and the Merkle proof (Merkle path), then it may verify from block headers that the certification transaction exists in the blockchain. An SPV node or other lightweight implementation may have a copy of block headers available to it, even offline, which may enable node B to verify the existence and content of the certification transaction without necessarily requiring live access to the blockchain network. Accordingly, node A may provide node B with the copy of the certification transaction and its Merkle path together with the transaction template.

Once node B has a copy of the certification transaction, in operation 408 it verifies that the certification transaction is signed by a certification authority using a certification authority key. It also verifies that node A's public key, $PK_A$, appears in the OP_RETURN output field of the certification transaction, thereby confirming that the certification authority has certified the authenticity of node A's public key. Node B may further validate the structure of the certification transaction and, in particular, that it includes a pay-topublic-key output referencing the certification transaction public key $PK_{CTX_A}$, consistent with the input to the transaction template.

It will be appreciated that if these checks fail, e.g. if node A's public key cannot be verified as certified or if the certification transaction is not structured as expected, then the method 400 will end since node B will not complete the transaction. However, assuming that node B verifies the certification transaction is valid, then in operation 410, it modifies the transaction template to add an input from an address controlled by node B. That is, node B adds a resource input to the transaction template and signs the input. This completes the transaction template, and node B may then propagate it on the blockchain network. Alternatively, node B may send the completed transaction template to node A, which may propagate it on the blockchain network.

In either case, one of two things will occur, as indicated by operation 412. If the certification transaction output to $PK_{CTX_A}$ is contained in the UTXO set, i.e. itis an unspent output, then the transaction will be validated by nodes in the blockchain network, will be propagated across the network, and will be added to the mempool of unconfirmed transactions to be mined and included in a block, as shown by operation 414. If, however, the certification transaction output to $PK_{CTX_A}$ is not in the UTXO set, e.g. because the certificate has already been used or has been revoked, then the transaction will not be validated, will not be propagated, and will be rejected by the blockchain network, as shown by operation 416. In this manner, the transaction between node A and node B only takes place if node A's certificate is valid at the time the transaction is committed to the blockchain network. Accordingly, there is no gap in time between validation of the certificate and reliance upon that validation in entering a transaction.

Figure 5:
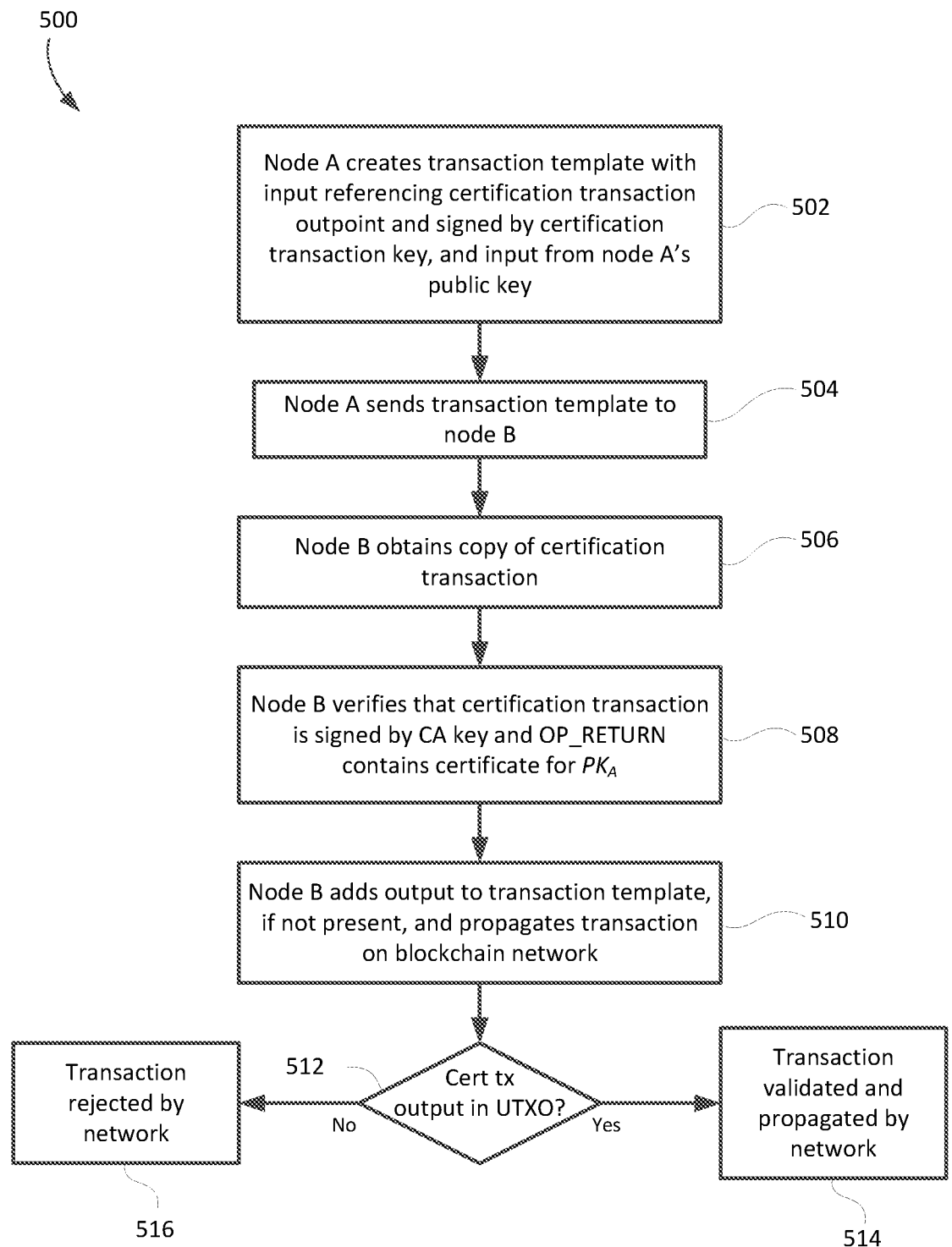
FIG. 5 shows, in flowchart form, another example method of validating a digital certificate.

Reference will now be made to FIG. 5, which shows, in flowchart form, another example method 500 of automatically validating a digital certificate. As with FIG. 4, the method 500 shown in FIG. 5 may be carried out by computing devices implementing a first node, node A, and a second node, node B. In the example of method 500, a transaction is generated to transfer resources from node A to node B. Node B seeks to validate node A's identity before accepting transfer of the resources, e.g., as part of a "know-your-customer" or anti-fraud record-keeping requirement, for example.

Node A creates the transaction template in operation 502 and includes an input referencing a certification transaction output from a certification transaction that certifies node A's public key. The input is signed by node A using the certification transaction key corresponding to the certification transaction public key referenced in the certification transaction output. Node A also adds an input transferring resources from its certified public key, $PK_A$. In operation 504, node A sends the transaction template to node B.

In operation 506, Node B retrieves a copy of the certification transaction from the blockchain, whether it is stored locally or remotely. The certification transaction is identified by a transaction identifier referenced in the input to the transaction template.

In operation 508, node B verifies that the certification transaction is signed by a certification authority using a certification authority key. It also verifies that node A's public key, $PK_A$, appears in the OP_RETURN output field of the certification transaction, thereby confirming that the certification authority has certified the authenticity of node A's public key. Node B may further validate the structure of the certification transaction and, in particular, that it includes a pay-to-public-key output referencing the certification transaction public key $PK_{CTX_A}$, consistent with the input to the transaction template.

It will be appreciated that if these checks fail, e.g. if node A's public key cannot be verified as certified or if the certification transaction is not structured as expected, then the method 500 will end since node B will not complete the transaction. However, assuming that node B verifies the certification transaction is valid, then in operation 510, it may modify the transaction template to add an output to an address controlled by node B. In some cases, node A may have already added an output to transfer resources to node B, in which case node B need only verify that the output is correct in operation 510. This completes the transaction template, and node B may then propagate it on the blockchain network. Alternatively, node B may send the completed transaction template to node A, which may propagate it on the blockchain network.

After the transaction is sent to a node of the blockchain network one of two things will occur, as indicated by operation 512. If the certification transaction output to $PK_{CTX_A}$ is contained in the UTXO set, i.e. it is an unspent output, then the transaction will be validated by nodes in the blockchain network, will be propagated across the network, and will be added to the mempool of unconfirmed transactions to be mined and included in a block, as shown by operation 514. If, however, the certification transaction output to $PK_{CTX_A}$ is not in the UTXO set, e.g. because the certificate has already been used or has been revoked, then the transaction will not be validated, will not be propagated, and will be rejected by the blockchain network, as shown by operation 516. In this manner, the transaction between node A and node B only takes place if node A's certificate is valid at the time the transaction is committed to the blockchain network. Accordingly, there is no gap in time between validation of the certificate and reliance upon that validation in entering a transaction.

Multiple-Use Certificates

As mentioned earlier, in the examples discussed above it assumed that once the digital certificate is used in a transaction to prove validity of a public key it is then invalid, since the certification transaction output would then have been "spent". That is, the certificate may only be used once and is automatically revoked once it is used. It may be desirable in some situations to have a certificate that may be used multiple times without requiring that the node obtain a fresh certificate from a certification authority after every use.

In one example, a multiple-use certificate may be created by providing the certificate transaction with a plurality of certification transaction outputs. The certification transaction may be structured to provide m possible uses. Each output may be used once in a verification operation. Once each output is "spent" it is no longer available. An example of such a certificate transaction is provided below:

| Certification Transaction - $\text{TXID}_{CTX\text{-}PK_A\text{-}Multi}$ | | | |
|---|---|---|---|
| Inputs: | | Outputs: | |
| Outpoint | Unlocking Script | Value | Locking Script |
| $\text{TXID}_{CA}$ | $<\text{SIG}_{CA}><\text{PK}_{CA}>$ | $x_1$ BSV | OP_DUP OP_HASH160 $<\text{PK}_{CTX_A}^{(1)}>$ OP_EQUALVERIFY OP_CHECKSIG |
| | | $x_2$ BSV | OP_DUP OP_HASH160 $<\text{PK}_{CTX_A}^{(2)}>$ OP_EQUALVERIFY OP_CHECKSIG |
| | | . | . |
| | | . | . |
| | | . | . |
| | | $x_m$ BSV | OP_DUP OP_HASH160 $<\text{PK}_{CTX_A}^{(m)}>$ OP_EQUALVERIFY OP_CHECKSIG |
| | | 0 BSV | OP_RETURN $<\text{Cert} << \text{PK}_A >>>$ |

The public keys $\text{PK}_{CTX_A}^{(i)}$ may be the same public key, may be different public keys that are completely independent of each other, or may be different public keys that are provably linked to each other. When node A uses this certification transaction in a transaction template, such as those given as examples above, node A ensures that the certification transaction output referenced as an outpoint in the transaction template is one of the m outputs that has not yet been used.

Node A may revoke its own certificate by submitting a transaction that spends all of the remaining unspent transaction outputs of the certificate. A certification authority may do the same to revoke the certificate; however, if the certification authority does not have trusted awareness of which of the outputs in the certification transaction are already spent then it will submit a separate transaction for each output to ensure revocation of the certificate.

The above example multiple-use certificate is advantageous in that it may be used by node A up to m times; however, after all the outputs have been exhausted then node A must obtain a new certificate from a certification authority. In another example, the certificate verification process may be constructed so that each verification further produces a new outpoint linked to the certificate transaction, thereby building a chain of transactions that leads back to the original certification transaction.

In one example implementation, if the certification authority does not need the ability to revoke a certificate, then a certificate in the form described above may be used. Each time that node A uses the certificate in a transaction, it ensures that the transaction generates a new pay-to-public-key output that it then uses as the certification transaction output in any subsequent transaction in which it uses its certificate.

In another example implementation, to ensure that the certification authority is able to revoke the certificate, the certification transaction, and each subsequent transaction in the chain, uses a multi-sig output. The multi-sig output allows for a 1-of-2 signature to unlock the output, and it includes public keys for both the certification authority and node A. One illustrative example is shown below:

| Certification Transaction - $\text{TXID}_{CTX\text{-}PK_A\text{-}linked}$ | | | |
|---|---|---|---|
| Inputs: | | Outputs: | |
| Outpoint | Unlocking Script | Value | Locking Script |
| $\text{TXID}_{CA}$ | $<\text{SIG}_{CA}><\text{PK}_{CA}>$ | x BSV | OP_1 $<\text{PK}_{CTX_A}><\text{PK}_{CA}>$ OP_2 OP_CHECKMULTISIG |
| | | 0 BSV | OP_RETURN $<\text{Cert} << \text{PK}_A >>>$ |

It will be appreciated that the holder of the certification transaction key corresponding to the certification transaction public key $\text{PK}_{CTX_A}$ is able to use the output in a verification or revocation transaction. That key is held by node A. It will further be appreciated that the certification authority has the ability to revoke the key by virtue of it having the private key corresponding to its public key $\text{PK}_{CA}$.

To use the certificate, node A creates a transaction template that includes a 1-of-2 multi-sig output that references both the certification authority and a new certification transaction key $\text{PK}_{CTX_A\text{-}new}$. In this manner, the transaction in which the certification transaction is used becomes the next transaction in a chain of transactions linked back to the certification transaction.

As an example, consider that node A enters into a transaction with node B in which node B transfers resources to node A, and node A proves the validity of its public key using its digital certificate. Such a transaction may take the form:

| $\text{TXID}_{CTX\text{-}PK_A\text{-}new\text{-}Linked}$ | | | |
|---|---|---|---|
| Inputs: | | Outputs: | |
| Outpoint | Unlocking Script | Value | Locking Script |
| $\text{TXID}_{Bob}$ | $<\text{SIG}_B><\text{PK}_B>$ | y BSV | OP_DUP OP_HASH160 $<\text{PK}_A>$ OP_EQUALVERIFY OP_CHECKSIG |

-continued

| $\text{TXID}_{CTX\text{-}PK_A\text{-}new\text{-}Linked}$ | | | |
|---|---|---|---|
| Inputs: | | Outputs: | |
| Outpoint | Unlocking Script | Value | Locking Script |
| $\text{TXID}_{CTX\text{-}PK_A}$ | $\text{OP\_0} < \text{SIG}_{CTX_A} >$ | z BSV | $\text{OP\_1} < \text{PK}_{CTX_A\text{-}new} >< \text{PK}_{CA} > \text{OP\_2}$ OP_CHECKMULTISIG |

In the above example transaction it will be noted that one of the inputs is from a public key $PK_B$ controlled by node B. This input is added to the transaction template by node B after node B confirms the structure of the transaction template is valid and the certificate for node A is verified.

The transaction is structured to transfer resources y BSV to public key $PK_A$, as indicated by the first outpoint. Another input references the certification transaction output $PK_{CTX_A}$. From this input, node B is able to identify the certification transaction $\text{TXID}_{CTX\text{-}PK_A}$, retrieve a copy of that certification transaction and confirm that it certifies node A's public key $PK_A$ and is signed by a certification authority. Node B is further able to confirm that the certification transaction, and any subsequent transactions in the chain, each contain a certification transaction output that is a 1-of-2 multi-sig output with the certification authority as one of the possible signatories. That is, that the certification authority has the ability to revoke certification.

Node B may optionally further evaluate whether node A has properly structured the certification transaction output in the current transaction template to provide node A with a renewed certification key and to enable the certification authority to revoke the certification if needed; however, node B does not necessarily need to confirm this in order to proceed with the transaction.

After the above-described transaction is submitted to the blockchain network, node A may subsequently prove its identity using the new linked public key $PK_{CTX_A\text{-}new}$. For example, in a subsequent transaction with node C, node A may provide a transaction template that includes as an input a reference to the certification transaction output via the new linked public key $PK_{CTX_A\text{-}new}$ and transaction identifier $\text{TXID}_{CTX\text{-}PK_A\text{-}new\text{-}Linked}$. Node C retrieves the linked transaction $\text{TXID}_{CTX\text{-}PK_A\text{-}new\text{-}Linked}$ and confirms that the outpoint referenced is a 1-of-2 multi-sig output operation for which the authorized signatories are the new linked public key $PK_{CTX_A\text{-}new}$ and the certification authority public key $PK_{CA}$. Node C then identifies the input certification transaction identifier $\text{TXID}_{CTX\text{-}PK_A}$, retrieves a copy of the certification transaction, confirms that it is signed by the certification authority, that it certifies public key $PK_A$, and that the certification transaction output is a 1-of-2 multi-sig output operation for which the authorized signatories are the certification transaction public key $PK_{CTX_A}$ and the certification authority public key $PK_{CA}$.

Subsequent transactions involving node A's certification are carried out in the same manner, with the other node tracing back through the series of linked transactions to ensure that their certification transaction outputs are structured correctly until it reaches the original certification transaction.

Figure 6:
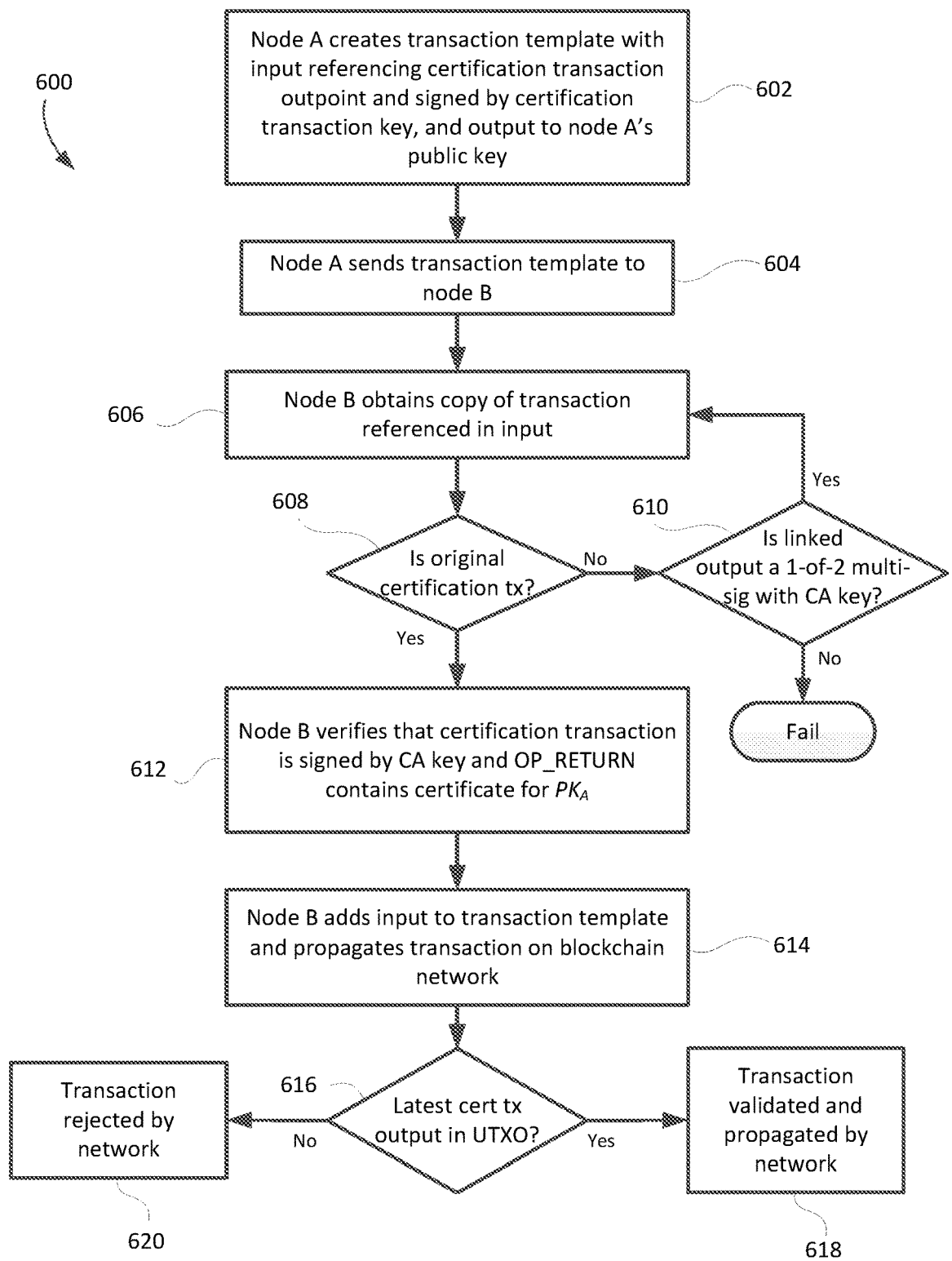
FIG. 6 shows, in flowchart form, a further example method of validating a digital certification using linked certification transactions.

Reference will now be made to FIG. 6, which shows, in flowchart form, a portion of a method 600 for validating a digital certificate using linked transactions. The method 600 provides an example of automated certificate verification for verifying the identity of a recipient. In this example transaction, node A is a recipient and node B is a sender. The method 600 begins with node A creating a transaction template in operation 602. In this example, the transaction template includes an input that references a certification transaction output from the last transaction in a series of linked certification transactions that trace back to an original certification transaction verifying the identity of node A, e.g. certifying node A's public key $PK_A$. The output in the last certification transaction is a pay-to-public-key operation referencing a certification transaction public key $PK_{CTX_A\text{-}current}$. The corresponding private key may be referred to as a current certification transaction key. The input to the transaction template is signed by the current certification transaction key generating a signature, $SIG_{CTX_A\text{-}current}$. The transaction template also includes an output transferring resources to node A's public key, $PK_A$.

Node A sends this transaction template to node B in operation 604. The transaction template does not yet contain an input from node B and/or if an input is included it is not signed by node B.

In operation 606, having received the transaction template, node B then obtains a copy of the transaction referenced in the input to the transaction template. The transaction may be the original certification transaction if node A has never used its certificate before, or it may be a linked certification transaction. In operation 608, node B assesses whether it is the original certification transaction. The original certification transaction contains an OP_RETURN output containing the certificate for $PK_A$, whereas a linked certification transaction contains two or more signed inputs referencing an earlier transaction outpoint, one of which is the previous certification transaction and the other of which may be input resources to the linked certification transaction. If node B determines that the retrieved transaction is a linked certification transaction and not the original certification transaction, then in operation 610 it determines whether the outpoint referenced is validly structured. For example, it may assess whether the outpoint includes a 1-of-2 multi-sig operation that includes the referenced certification public key, e.g. $PK_{CTX_A\text{-}current}$ or $PK_{CTX_A\text{-}linked}$, and a certification authority public key, e.g. $PK_{CA}$. If the retrieved transaction does not have a referenced outpoint that is structured correctly, then node B may reject the transaction as it cannot verify node A's public key. However, if it is structured correctly, then the method 600 returns to operation 606 to obtain the previous transaction in the linked series based on the inputs in the retrieved transaction. The method 600 continues with tracing back through linked transactions, confirming at each step that the referenced outpoints are properly formatted to enable certification authority revocation, until the original certification transaction is identified in operation 608.

Once the original certification transaction is identified, then in operation 612 node B verifies that the certification transaction is signed by a certification authority using a certification authority key. It also verifies that node A's public key, $PK_A$, appears in the OP_RETURN output field of the certification transaction, thereby confirming that the certification authority has certified the authenticity of node A's public key. It may further verify that the certification transaction output is a 1-of-2 multi-sig output to certification transaction public key $PK_{CTX_A}$ and certification authority public key $PK_{CA}$.

If node B is satisfied that the original certification transaction is valid, then in operation 614 it adds an input to the transaction template to supply the resources being transferred to node A's public key $PK_A$. It then submits the completed transaction template to the blockchain network in operation 614, and as indicated by operation 616, if the certification transaction output to certification transaction public key $PK_{CTX_A\text{-}current}$ in the latest certification transaction in the series is still valid, i.e. still an unspent outpoint in the UXTO set, then the transaction is processed in operation 618. Otherwise, it is rejected by the blockchain network as invalid in operation 620.

In one implementation, the value transferred to each certification transaction output in the series of certification transaction outputs may be fixed value x that the verifying node confirms when it evaluates the form and content of each transaction in the series. In another implementation, to put a cap on the number of times a certification may be reused, the value may start with a fixed amount in the original certification transaction and may be decremented by a certain amount with each use, such that at some point no further renewals may occur. The amount decremented may match a transaction fee amount, in some implementations.

It will be appreciated that the certification authority may revoke this certificate by identifying the latest transaction in the series of certification transactions and using the certification authority's key to spend the 1-of-2 multi-sig output.

Figure 7:
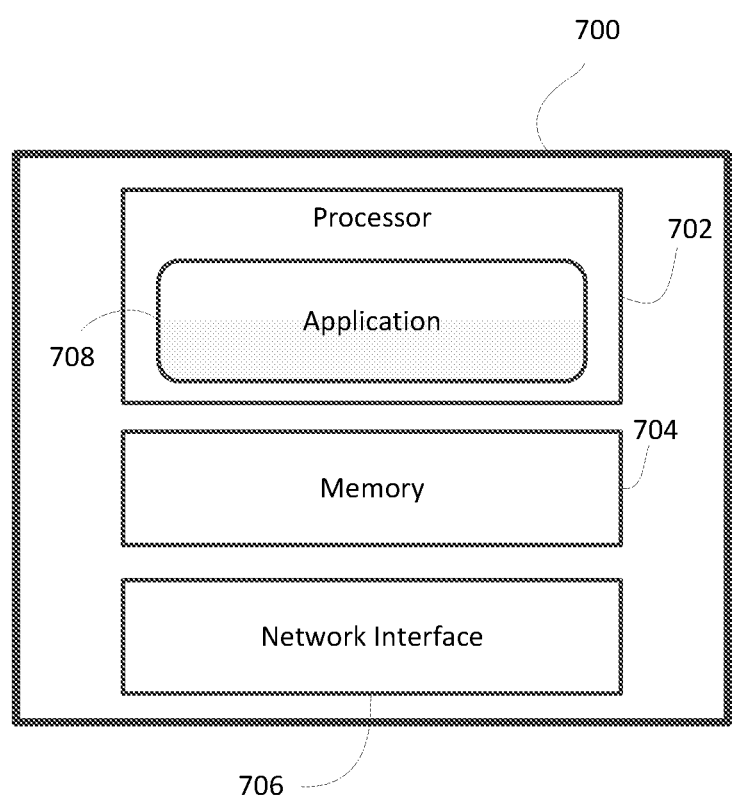
FIG. 7 shows, in block diagram form, a simplified example of node that may implement at least part of one of the described methods.

Reference is now made to FIG. 7, which shows, in block diagram form, a simplified computing device 700, in accordance with an example of the present application. The computing device 700 may carry out one or more of the above-described functions. In this sense it may serve as the first computing device 102 (FIG. 1), the second computing device 104 (FIG. 1), or the server 106 (FIG. 1) in some implementations.

The computing device 700 includes a processor 702, which may include one or more microprocessors, application specific integrated circuits (ASICs), microcontrollers, or similar computer processing devices. The computing device 700 may further include memory 704, which may include persistent and non-persistent memory, to store values, variables, and in some instances processor-executable program instructions, and a network interface 706.

The computing device 700 may include a processor-executable application 708 containing processor-executable instructions that, when executed, cause the processor 702 to carry out one or more of the functions or operations described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of validating a certificate associated with a first node, the method comprising:
   receiving a transaction template from the first node, the transaction template containing a first input that references a certification transaction output and is signed by a certification transaction key;
   obtaining a copy of a certification transaction and determining that the certification transaction includes the certificate associated with the first node and that the certification transaction is signed by a certification authority key, wherein obtaining includes identifying a last transaction in a series of linked transactions based on the last transaction containing the certification transaction output, and tracing through the series of linked transactions to identify the certification transaction; and
   propagating the transaction template on a blockchain network, wherein the transaction template propagated includes a second input transferring resources to an output address,
   and whereby the transaction template is to be validated by nodes on the blockchain network if the certification transaction output is contained within an unspent transaction output set.

2. The method of claim 1, wherein the transaction template includes an input from a first public key associated with the first node, and wherein the certificate includes the first public key.

3. The method of claim 2, wherein propagating includes adding, to the transaction template prior to propagation, an output to a second public key associated with a second node.

4. The method of claim 1, wherein the transaction template includes an output to a first public key associated with the first node, and wherein the certificate includes the first public key.

5. The method of claim 4, wherein propagating includes adding, to the transaction template prior to propagation, an input from a second public key associated with a second node.

6. The method of claim 1, wherein the certification transaction output includes a pay-to-public-key output in the certification transaction.

7. The method of claim 6, wherein the certification transaction output is one of a plurality of pay-to-public-key outputs in the certification transaction, and wherein each of the pay-to-public-key outputs in the certification transaction involves a different respective public key.

8. The method of claim 1, wherein obtaining further includes verifying that the certification transaction output is a multi-signature output for which a permitted signatory includes the certification authority key.

9. The method of claim 1, wherein the unspent transaction output set includes all transaction outputs not yet utilized as an input to a further transaction, and wherein the unspent transaction output set is maintained by the blockchain network.

10. The method of claim 1, wherein the certification transaction output is in a transaction having a transaction identifier, and wherein the first input in the transaction template references the transaction identifier and wherein the certification transaction key is a private key associated with the transaction identifier and an index.

11. The method of claim 1, wherein obtaining includes transmitting a request for the certification transaction to a node in the blockchain network and receiving a response containing the certification transaction.

12. The method of claim 1, wherein obtaining includes receiving, from the first node, the copy of the certification transaction and a Merkle path associated with the certification transaction, and wherein the method further includes verifying that the certification transaction existing in a blockchain based on the copy of the certification transaction, the Merkle path, and a set of block headers for the blockchain.

13. A computing device to validate a certificate associated with a first node, the computing device including:
one or more processors;
memory;
computer-executable instructions stored in the memory that, when executed by the one or more processors, cause the one or more processors to:
receive a transaction template from the first node, the transaction template containing a first input that references a certification transaction output and is signed by a certification transaction key;
obtain a copy of a certification transaction and determine that the certification transaction includes the certificate associated with the first node and that the certification transaction is signed by a certification authority key; and
propagate the transaction template on a blockchain network, wherein the transaction template propagated includes a second input transferring resources to an output address,
and whereby the transaction template is to be validated by nodes on the blockchain network if the certification transaction output is contained within an unspent transaction output set,
and wherein the instructions, when executed, are to cause the one or more processors to identify a last transaction in a series of linked transactions based on the last transaction containing the certification transaction output, and to trace through the series of linked transactions to obtain the certification transaction.

14. The computing device of claim 13, wherein the transaction template includes an input from a first public key associated with the first node, and wherein the certificate includes the first public key, and wherein the instructions, when executed, are to cause the one or more processors to add, to the transaction template prior to propagation, an output to a second public key associated with a second node.

15. The computing device of claim 13, wherein the transaction template includes an output to a first public key associated with the first node, and wherein the certificate includes the first public key, and wherein the instructions, when executed, are to cause the one or more processors to add, to the transaction template prior to propagation, an input from a second public key associated with a second node.

16. The computing device of claim 13, wherein the certification transaction output includes a pay-to-public-key output in the certification transaction, and wherein the certification transaction output is one of a plurality of pay-to-public-key outputs in the certification transaction, and wherein each of the pay-to-public-key outputs in the certification transaction involves a different respective public key.

17. The computing device of claim 13, wherein the certification transaction output is in a transaction having a transaction identifier, and wherein the first input in the transaction template references the transaction identifier and wherein the certification transaction key is a private key associated with the transaction identifier and an index.

18. A non-transitory computer-readable medium storing processor-executable instructions for validating a certificate associated with a first node, the processor-executable instructions including instructions that, when executed by one or more processors, cause the one or more processors to:
receive a transaction template from the first node, the transaction template containing a first input that references a certification transaction output and is signed by a certification transaction key;
obtain a copy of a certification transaction and determine that the certification transaction includes the certificate associated with the first node and that the certification transaction is signed by a certification authority key; and
propagate the transaction template on a blockchain network, wherein the transaction template propagated includes a second input transferring resources to an output address,
and whereby the transaction template is to be validated by nodes on the blockchain network if the certification transaction output is contained within an unspent transaction output set,
and wherein the instructions, when executed, are to cause the one or more processors to identify a last transaction in a series of linked transactions based on the last transaction containing the certification transaction output, and to trace through the series of linked transactions to obtain the certification transaction.

19. A computer-implemented method of validating a certificate associated with a first node, the method comprising:
receiving a transaction template from the first node, the transaction template containing a first input that references a certification transaction output and is signed by a certification transaction key;
receiving, from the first node, a copy of a certification transaction and a Merkle path associated with the certification transaction, and determining that the certification transaction includes the certificate associated with the first node and that the certification transaction is signed by a certification authority key;
verifying that the certification transaction exists in a blockchain based on the copy of the certification transaction, the Merkle path, and a set of block headers for the blockchain; and
propagating the transaction template on a blockchain network, wherein the transaction template propagated includes a second input transferring resources to an output address,
and whereby the transaction template is to be validated by nodes on the blockchain network if the certification transaction output is contained within an unspent transaction output set.

20. The method of claim 19, wherein the transaction template includes an input from a first public key associated with the first node, and wherein the certificate includes the first public key.

21. The method of claim 20, wherein propagating includes adding, to the transaction template prior to propagation, an output to a second public key associated with a second node.

22. The method of claim 19, wherein the transaction template includes an output to a first public key associated with the first node, and wherein the certificate includes the first public key.

23. The method of claim 22, wherein propagating includes adding, to the transaction template prior to propagation, an input from a second public key associated with a second node.

24. The method of claim 19, wherein obtaining includes identifying a last transaction in a series of linked transactions based on the last transaction containing the certification transaction output, and tracing through the series of linked transactions to identify the certification transaction.

25. The method of claim 24, obtaining further includes verifying that the certification transaction output is a multi-signature output for which a permitted signatory includes the certification authority key.

26. A computing device to validate a certificate associated with a first node, the computing device including:
   one or more processors;
   memory;
   computer-executable instructions stored in the memory that, when executed by the one or more processors, cause the one or more processors to:
      receive a transaction template from the first node, the transaction template containing a first input that references a certification transaction output and is signed by a certification transaction key;
      obtain a copy of a certification transaction and determine that the certification transaction includes the certificate associated with the first node and that the certification transaction is signed by a certification authority key;
      receive, from the first node, a Merkle path associated with the certification transaction;
      verify that the certification transaction exists in a blockchain based on the copy of the certification transaction, the Merkle path, and a set of block headers for the blockchain; and
      propagate the transaction template on a blockchain network, wherein the transaction template propagated includes a second input transferring resources to an output address,
      and whereby the transaction template is to be validated by nodes on the blockchain network if the certification transaction output is contained within an unspent transaction output set.

27. The computing device of claim 26, wherein the transaction template includes an input from a first public key associated with the first node, and wherein the certificate includes the first public key.

28. The computing device of claim 27, wherein the instructions, when executed, are to cause the one or more processors to propagate by adding, to the transaction template prior to propagation, an output to a second public key associated with a second node.

29. The computing device of claim 26, wherein the transaction template includes an output to a first public key associated with the first node, and wherein the certificate includes the first public key.

30. The computing device of claim 29, wherein the instructions, when executed, are to cause the one or more processors to propagate by adding, to the transaction template prior to propagation, an input from a second public key associated with a second node.

31. The computing device of claim 26, wherein the instructions, when executed, are to cause the one or more processors to obtain the certification transaction by identifying a last transaction in a series of linked transactions based on the last transaction containing the certification transaction output, and tracing through the series of linked transactions to identify the certification transaction.

32. The computing device of claim 31, wherein the instructions, when executed, are to further cause the one or more processors to verify that the certification transaction output is a multi-signature output for which a permitted signatory includes the certification authority key.

33. A non-transitory computer-readable medium storing processor-executable instructions for validating a certificate associated with a first node, the processor-executable instructions including instructions that, when executed by one or more processors, cause the one or more processors to:
   receive a transaction template from the first node, the transaction template containing a first input that references a certification transaction output and is signed by a certification transaction key;
   obtain a copy of a certification transaction and determine that the certification transaction includes the certificate associated with the first node and that the certification transaction is signed by a certification authority key;
   receive, from the first node, a Merkle path associated with the certification transaction;
   verify that the certification transaction exists in a blockchain based on the copy of the certification transaction, the Merkle path, and a set of block headers for the blockchain; and
   propagate the transaction template on a blockchain network, wherein the transaction template propagated includes a second input transferring resources to an output address,
   and whereby the transaction template is to be validated by nodes on the blockchain network if the certification transaction output is contained within an unspent transaction output set.

* * * * *